(12) United States Patent
Zhang et al.

(10) Patent No.: US 9,717,126 B1
(45) Date of Patent: Jul. 25, 2017

(54) CURRENT CONTROL CIRCUITS

(71) Applicant: PRINCETON TECHNOLOGY CORPORATION, New Taipei (TW)

(72) Inventors: Shengyou Zhang, New Taipei (TW); Xin Meng, New Taipei (TW)

(73) Assignee: Princeton Technology Corporation, New Taipei (TW)

( * ) Notice: Subject to any disclaimer, the term of this patent is extended or adjusted under 35 U.S.C. 154(b) by 0 days.

(21) Appl. No.: 15/208,888

(22) Filed: Jul. 13, 2016

(30) Foreign Application Priority Data

Apr. 6, 2016 (CN) .......................... 2016 1 0210272

(51) Int. Cl.
*H05B 33/08* (2006.01)
*H05B 37/00* (2006.01)

(52) U.S. Cl.
CPC ....... *H05B 33/0842* (2013.01); *H05B 33/083* (2013.01); *H05B 33/0806* (2013.01); *H05B 33/0815* (2013.01); *H05B 33/0827* (2013.01); *H05B 33/0845* (2013.01)

(58) Field of Classification Search
CPC ............ H05B 33/0812; H05B 33/0824; H05B 33/0815; H05B 33/083; H05B 33/0845; H05B 33/0887; H05B 37/02; H05B 33/0842; H05B 33/0806; Y02B 20/345; Y02B 20/347; Y02B 20/343
See application file for complete search history.

(56) References Cited

U.S. PATENT DOCUMENTS

| | | | | |
|---|---|---|---|---|
| 7,663,599 B1* | 2/2010 | Lin | ......................... | G09G 3/342 |
| | | | | 345/102 |
| 8,134,303 B2* | 3/2012 | Lys | ..................... | H05B 33/0815 |
| | | | | 315/291 |
| 8,665,922 B2* | 3/2014 | Fujimura | ................ | H01S 5/042 |
| | | | | 315/209 R |
| 8,680,782 B2* | 3/2014 | Sakuragi | ................ | H05B 37/02 |
| | | | | 315/185 S |
| 9,101,014 B2* | 8/2015 | Li | ....................... | H05B 33/0812 |
| 9,338,844 B2* | 5/2016 | Ohtake | .............. | H05B 33/0815 |
| 9,648,682 B1* | 5/2017 | Zhang | ................ | H05B 33/0815 |
| 2016/0183345 A1* | 6/2016 | Fischer | .............. | H05B 33/0812 |
| | | | | 315/201 |

* cited by examiner

*Primary Examiner* — Vibol Tan
(74) *Attorney, Agent, or Firm* — Muncy, Geissler, Olds & Lowe, P.C.x

(57) ABSTRACT

A current control circuit for a driving circuitry system of an LED component is provided. In the driving circuitry system, a rectifier provides a rectified voltage to an anode of the LED component, and a current module sets a current flowing through the LED component. In the current control circuit, input and output terminals of a voltage regulator are respectively coupled to the input terminal of the current module and a non-inverting input terminal of an operational amplifier. An inverting input terminal of the operational amplifier is coupled to an output terminal of the current module, and an output terminal thereof is coupled to one terminal of a capacitor. An output-terminal voltage of the first operational amplifier is provided as a reference voltage for the current module. One terminal of a resistor is coupled to the inverting input terminal of the operational amplifier.

5 Claims, 6 Drawing Sheets

CURRENT CONTROL CIRCUITS

CROSS REFERENCE TO RELATED APPLICATIONS

This Application claims priority of China Patent Application No. 201610210272.3, filed on Apr. 6, 2016, the entirety of which is incorporated by reference herein.

BACKGROUND OF THE INVENTION

Field of the Invention

The invention relates to an electronic circuit, and more particularly, to a current control circuit for a driving circuitry system of a light-emitting diode (LED) component.

Description of the Related Art

Generally, an LED driving circuitry system is used to rectify an AC voltage from an electric grid for driving an LED component. A serious problem in this manner of driving is that the fluctuation occurring on the AC voltage from the electric grid induces fluctuation of the average current of the LED component.

Based on the principles of behavior of LEDs, only when an input voltage is higher than the forward turn-on voltage of the LED, the LED is turned on. Thus, the turn-on angle of the LED (that is the electrical angle which is converted from the time when the LED is turned on continuously in one period of the AC voltage) varies with the fluctuation occurring on the AC voltage from the electric grid, which results in fluctuation of the average current of the LED.

FIG. 1 shows the structure of a current LED driving circuitry system. In the LED driving circuitry system, an operational amplifier OP, a transistor M1, and a resistor $R_{CS}$ form a linear current control loop P1 to set the current $I_O$ flowing through the LED component. In the circuitry system, the LED average current $I_{AVG}$ is defined as the result obtained by dividing a product by the total time, wherein the product is obtained by multiplying the LED instantaneous current by the turn-on time. The average current $I_{AVG}$ is represented by Equation (1):

$$I_{AVG}=V_{REF}'\times ton/(R_{CS}\times T) \quad \text{Equation (1):}$$

$V_{REF}'$ represents the voltage at the non-inverting input terminal of the operational amplifier OP and also represents the reference voltage of the current module composed of the operational amplifier OP and the transistor M1. $V_{REF}'$ is provided by a voltage regulator, and it is always a constant. $R_{CS}$ represents the resistance value of the resistor $R_{CS}$. ton represents the LED turn-on time (that is the sum of the turn-on times of the LED component in periods among the preset total time). T represents the preset total time. FIG. 2 shows the timing chart of the circuitry system in FIG. 1. According to the above equation and the timing chart of FIG. 2, when the voltage fluctuates in an increasing direction, the turn-on angle becomes larger (that is, ton becomes larger), and the LED average current increases. When the voltage fluctuates in a decreasing direction, the turn-on angle becomes less (that is, ton becomes less), and the LED average current decreases. The LED average current fluctuates with the fluctuation of the voltage from the electric grid, which induces LED flicker.

BRIEF SUMMARY OF THE INVENTION

Thus, the present invention provides a current control circuit for a driving circuitry system of a light-emitting diode (LED) component, which is capable of keeping the average current of the LED component constant when the AC voltage provided by the electric grid fluctuates.

An exemplary embodiment of a current control circuit for a driving circuitry system of a light-emitting diode (LED) component. The driving circuitry system comprises a current module and a rectifier. The rectifier performs full-wave rectification on an AC input and provides a rectified voltage to an anode of the LED component. An input terminal of the current module is coupled to a cathode of the LED component to set a current flowing through the LED component. The current control circuit comprises a voltage regulator, a first operational amplifier, a capacitor, and a resistor. An input terminal of the voltage regulator is coupled to the input terminal of the current module, and an output terminal of the voltage regulator is coupled to a non-inverting input terminal of the first operational amplifier. An inverting input terminal of the first operational amplifier is coupled to an output terminal of the current module, and an output terminal of the first operational amplifier is coupled to one teiuiinal of a capacitor. An output-terminal voltage of the first operational amplifier is provided as a reference voltage for the current module. The one terminal of the capacitor is coupled to the output terminal of the first operational amplifier, and another terminal of the capacitor is coupled to a ground. One terminal of the resistor is coupled to the inverting input terminal of the first operational amplifier, and another terminal of the resistor is coupled to the ground.

In an exemplary embodiment, the driving circuitry system comprises a plurality of LED components and a plurality of current modules which set turn-on currents for the plurality of LED components. The input terminal of the voltage regulator is coupled to an input terminal of a first current modules among the plurality of current modules, and the inverting input terminal of the first operational amplifier is coupled to a common output terminal In another exemplary embodiment, the current control circuit further comprises a voltage-division circuit which divides the output-terminal voltage of the first operational amplifier to provide reference voltages for the plurality of current modules.

In another exemplary embodiment, the current module comprises a second operational amplifier and a transistor. A non-inverting input terminal of the second operational amplifier receives the reference voltage provided by the current control circuit, an inverting input terminal of the second operational amplifier is coupled to the output terminal of the current module, and an output terminal of the second operation amplifier coupled a gate of the transistor. A drain of the transistor is coupled to the input terminal of the current module, and a source of the transistor is coupled to the output terminal of the current module.

In another exemplary embodiment, the output-terminal voltage of the first operational amplifier decreases when the LED component is turned on and increases when the LED component is turned off.

In another exemplary embodiment, an average current flowing through the LED component is defined as:

$$I_{AVG}=V_{REF}\times R_{CS}$$

$V_{REF}$ represents a voltage at the non-inverting input terminal of the first operational amplifier, and $R_{CS}$ represents a resistance value of the resistor.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
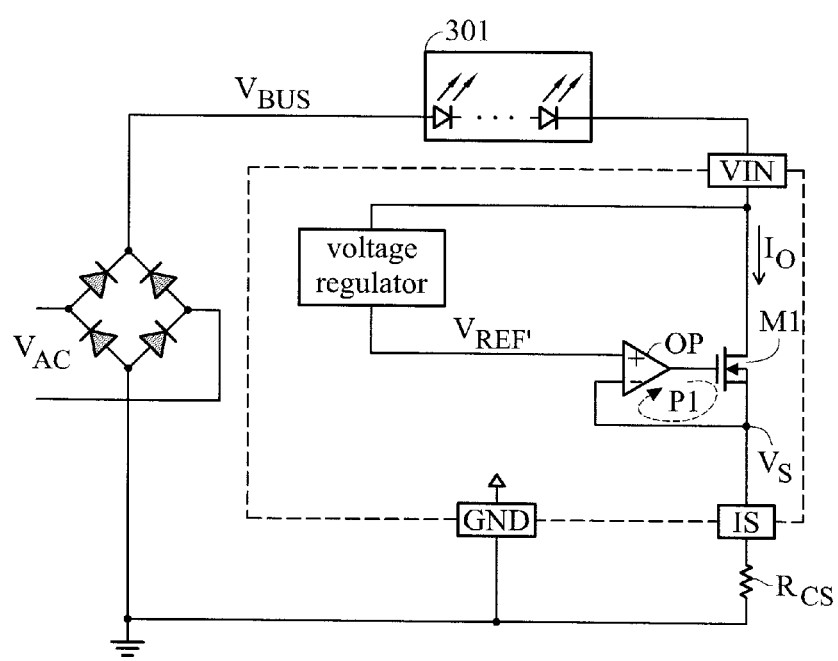
FIG. 1 shows a structure of a current LED driving circuitry system.

To better understand the technical aspects of the present invention, the following embodiments of the invention will be described in detail by referring to the drawings.

Here a dedicated word "exemplary" means "serving as an example, embodiment, or illustration." Any "exemplary" embodiment herein does not have to be interpreted as being better than other embodiments.

In addition, in order to better illustrate the present invention, the following detailed description, numerous specific details are given. Those skilled in the art would understand that without some specific details, the invention may be practiced. In other embodiments, well known methods, tools, components and circuits have not been described in detail in order to highlight the spirit of the invention.

Figure 3:
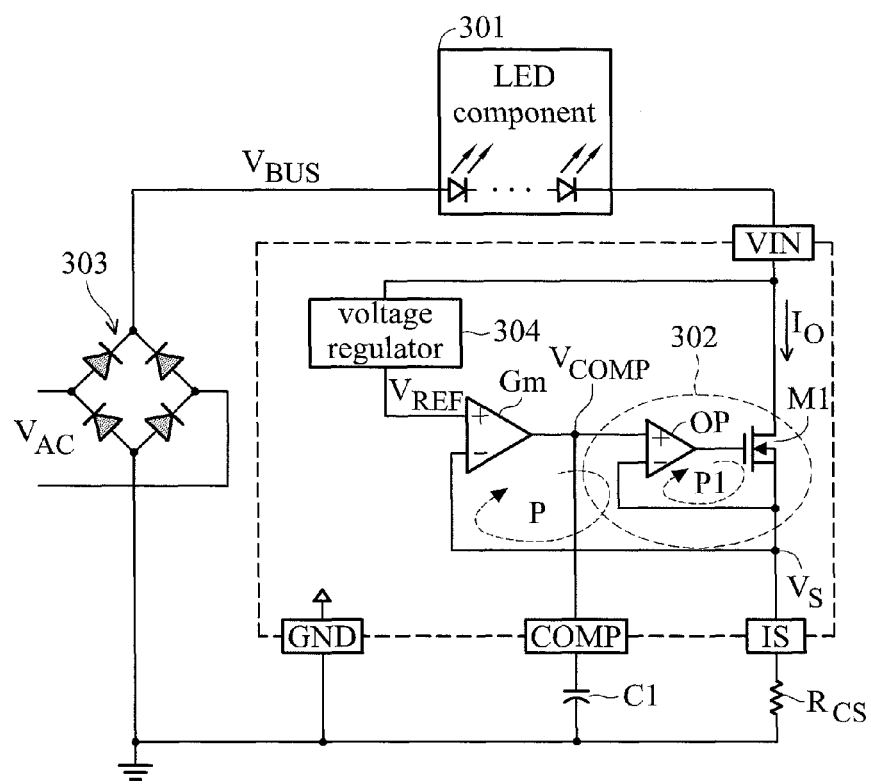
FIG. 3 shows an exemplary embodiment of a current control circuit.

FIG. 3 shows an exemplary embodiment of a current control circuit. The current control circuit is applied for a driving circuitry system of a light-emitting diode (LED) component.

As shown in FIG. 3, the driving circuitry system comprises a current module 302 and a rectifier 303. The rectifier 303 rectifies an input AC voltage $V_{AC}$ and provides the rectified voltage to the anode of the LED component 301. The input terminal VIN of the current module 302 is coupled to the cathode of the LED component 301 to set the current $I_O$ flowing through the LED component.

In an embodiment, the structure of the current module 302 is similar to the structure shown in FIG. 1. The current module 302 is composed of the operational amplifier (second operational amplifier) OP and the transistor M1. The non-inverting input terminal of the operational amplifier OP receives the reference voltage $V_{COMP}$ provided by the current control circuit, the inverting input terminal thereof is coupled to the output terminal of the current module, and the output terminal thereof is coupled to the gate of the transistor M1. The drain of the transistor M1 is coupled to the input terminal VIN of the current module 302, and the source thereof is coupled to the output terminal IS of the current module. The transistor M1 is implemented by, for example, a MOS transistor. In the embodiment of FIG. 3, the transistor M1 is implemented by an N-type MOS transistor. Those skilled in the art should understand that the transistor M1 may be implemented by other type of transistors to achieve the similar switching operation. The specific structure of the transistor M1 can be determined according to actual requirements, without limitation to the present invention.

As shown in FIG. 3, the current control circuit of the embodiment comprises a voltage regulator 304, an operational amplifier (first operational amplifier) Gm, a capacitor C1, and a resistor $R_{CS}$. The input terminal of the voltage regulator 304 is coupled to the input terminal VIN of the current module 304 (that is the cathode of the LED component 301), and the output terminal thereof is coupled to the non-inverting input terminal of the operation amplifier Gm. The voltage regulator 304 regulates to the voltage at the input terminal VIN to provide a stable reference voltage $V_{REF}$ to the non-inverting input terminal of the operational amplifier Gm. The inverting input terminal of the operational amplifier Gm is coupled to the output terminal IS of the current module, and the output terminal coupled to one terminal of the capacitor C1 to provide the reference voltage $V_{COMP}$ to the current module. One input terminal of the capacitor C1 is coupled to the output terminal of the operational amplifier Gm, and the other input terminal thereof is coupled to the ground. One terminal of the resistor R1 is coupled to the inverting input terminal of the operational amplifier Gm (that is the output terminal IS of the current module IS), and the other terminal thereof is coupled to the ground.

Note that the dotted lines shown in FIG. 3 and the other circuitry structure figures represent exemplary current packages. The elements disposed on the inside of the block drawn by the dotted lines are circuit elements which are integrated into one single chip. The terminals VIN, IS, GND, and COMP on the dotted lines are the pins of the chip. One skilled in the art will understand that the packages shown in FIG. 3 and other circuitry structure figures are exemplary embodiments. The chip package can be implemented according to actual requirements, without limitation to the present invention. For example, the capacitor C1 and the resistor $R_{CS}$ can be integrated into the same chip with the operation amplifier Gm.

Figure 4A:
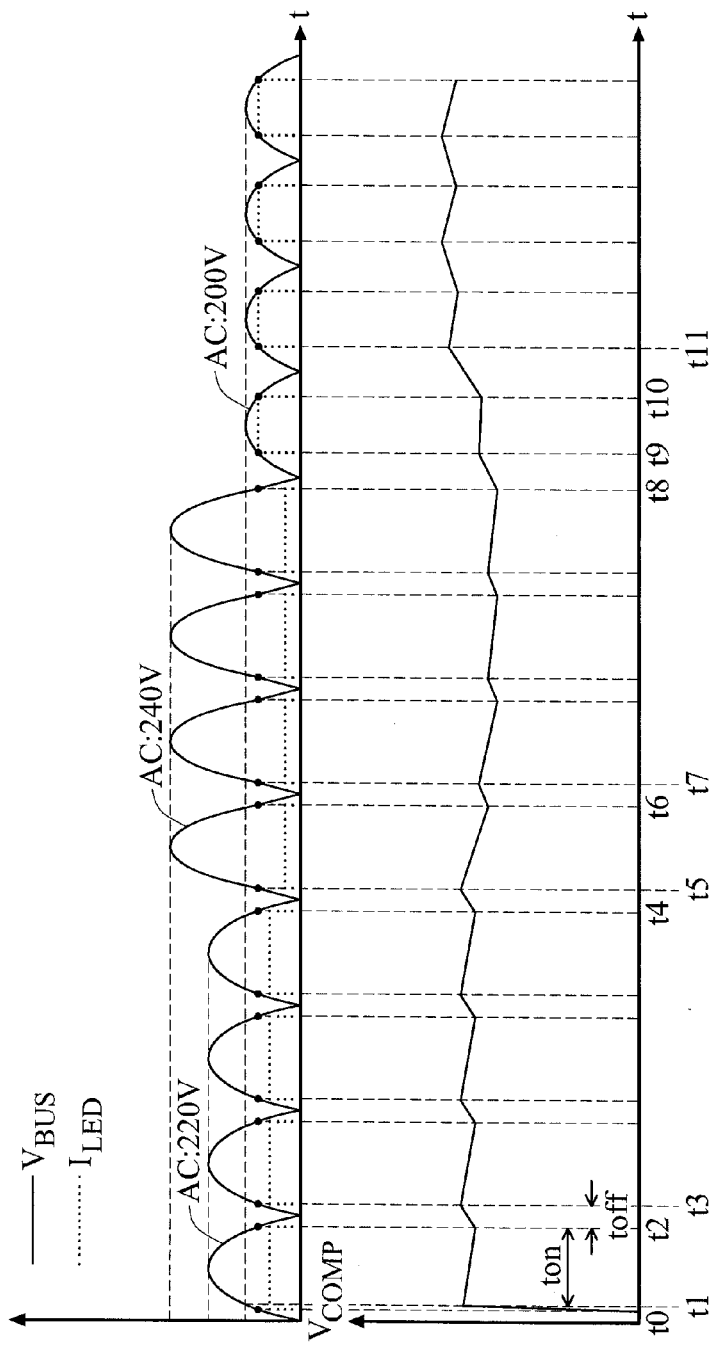
FIGS. 4A and 4B show operation timing charts of the circuit shown in FIG. 3.
Figure 4B:
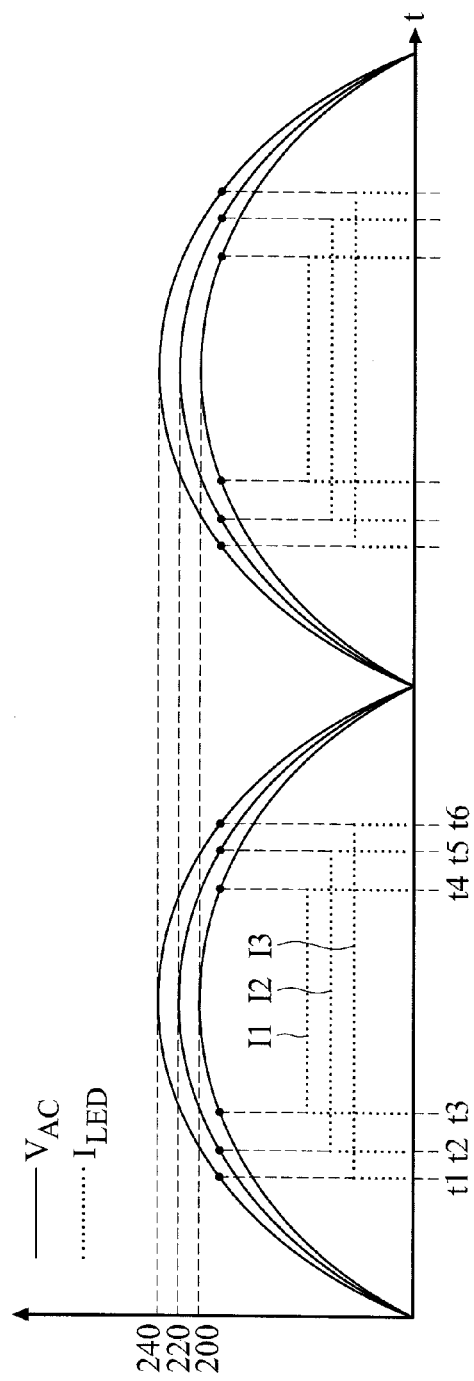

FIGS. 4A and 4B show the operation timing charts of the circuit shown in FIG. 3. The operation of the current control circuit will be described by referring to the embodiment of FIG. 3 and the timing charts of FIGS. 4A and 4B.

As shown in FIG. 3, the rectifier 303 performs the full-wave rectification on the AC voltage $V_{AC}$ from the electric grid to generate the output voltage $V_{BUS}$. The output voltage $V_{BUS}$ is provides to the LED component to power the circuit herein. The operational amplifier OP, the transistor M1, and the resistor $R_{CS}$ form a current control loop P1 to determine the LED instantaneous current $ILED_{SINGLE}$ induced when the LED component is turned on during one single period, referring to Equation (2):

$$ILED_{SINGLE}=V_{COMP} \times R_{CS} \qquad \text{Equation (2)}$$

$V_{COMP}$ represents the reference voltage of the current module, that is the voltage at the output terminal of the operational amplifier Gm. $R_{CS}$ represents the resistance value of the resistor $R_{CS}$.

The operational amplifier Gm is coupled to the capacitor C1 to form an integrator. Moreover, the operational amplifier Gm, the transistor M1, and the resistor $R_{CS}$ form the loop P to determine the LED average current $ILED_{AVG}$.

As shown in FIG. 4A, when the system is powered on, if there is no fluctuation of the voltage from the electric grid, the input AC voltage $V_{AC}$ is 220V. The rectifier 303 performs the full-wave rectification on the AC voltage $V_{AC}$ to generate the output voltage $V_{BUS}$. When the voltage $V_{BUS}$ is higher than the forward turn-on voltage of the LED component 301, the terminal VIN generates a voltage, and the circuit starts to operate. The non-inverting input terminal of the operational amplifier OP is pre-charged rapidly to obtain the initial value of the voltage $V_{COMP}$, as shown in the period between time points t0-t1 of FIG. 4A. Then, in one single period, when the output voltage $V_{BUS}$ is higher than the turn-on voltage of the LED component 301, the LED component is turned on (referring to the period between time points t1-t2 of FIG. 4A, that is "ton"), and the capacitor C1 is discharged, which results in decrease of the voltage $V_{COMP}$; when the output voltage $V_{BUS}$ is lower than the turn-on voltage of the LED component 301, the LED component is turned off (referring to the period between time points t2-t3 of FIG. 4A, that is "toff"), and the capacitor C1 is charged, which results in increase of the voltage $V_{COMP}$. In cases where there is no fluctuation of the voltage from the electric grid, the turn-on time in each period is constant, and the average value of the voltage $V_{COMP}$ in one single period is constant, so the average current of the LED component is also constant.

As shown in FIG. 4A, when the voltage $V_{AC}$ fluctuates in an increasing direction from 220V, for example, to 240V, the LED turn-on time becomes longer (referring to the period between time points t5-t6), and the LED turn-off time becomes shorter (referring to the period between time points t6-t7), which means that the discharging time of the capacitor C1 becomes longer, while the charging time thereof becomes shorter. Thus, the average value of the voltage $V_{COMP}$ decreases, which results in the induced current decreasing when the LED component is turned on ($I_{LED}$ shown in FIG. 4a represents the average value of the current when the LED component is turned in one single period). Accordingly, even though the turn-on time becomes longer, the LED average current keeps constant without variation.

As shown in FIG. 4A, when the voltage $V_{AC}$ fluctuates in a decreasing direction from 240V, for example, to 200V, the LED turn-on time becomes shorter (referring to the period between time points t9-t10), and the LED turn-off time becomes longer (referring to the period between time points t10-t11), which means that the discharging time of the capacitor C1 becomes shorter, while the charging time thereof becomes longer. Thus, the average value of the voltage $V_{COMP}$ increases, which results in the induced current increasing when the LED component is turned on. Accordingly, even though the turn-on time becomes shorter, the LED average current keeps constant without variation.

FIG. 4B is a schematic diagram showing the principle of keeping the LED current constant by the current control circuit of the embodiment. In FIG. 4B, I1, I2, and I3 represent the average currents occurring when the LED component is turned on in one single period in cases where the voltage $V_{AC}$ from the electric grid is 200V, 220V, and 240V, respectively. Referring to FIG. 4B, the principle of keeping the LED average current constant is that, in one single period, the decrease or increase of the turn-on angle, which is induced by the decrease or increase of the AC voltage, can be compensated for by the increase or decreaset of the current occurring when the LED component is turned on. In more detail, when the voltage $V_{AC}$ decreases, the LED turn-on angle decreases. At this time, the voltage $V_{COMP}$ increases, and the current occurring when the LED component is turned on increases so that the LED average current keeps constant. When the voltage $V_{AC}$ increases, the LED turn-on angle increases. At this time, the voltage $V_{COMP}$ decreases, and the current occurring when the LED component is turned on decreases so that the LED average current keeps constant.

For the long term in the time dimension (for example, including more than 1000 periods of the AC voltage), the current control circuit of the embodiment can keep the average current $ILED_{AVG}$ of the LED component as a constant shown in Equation (3):

$$ILED_{AVG} = V_{REF} \times R_{CS} \qquad \text{Equation (3)}$$

Figure 2:
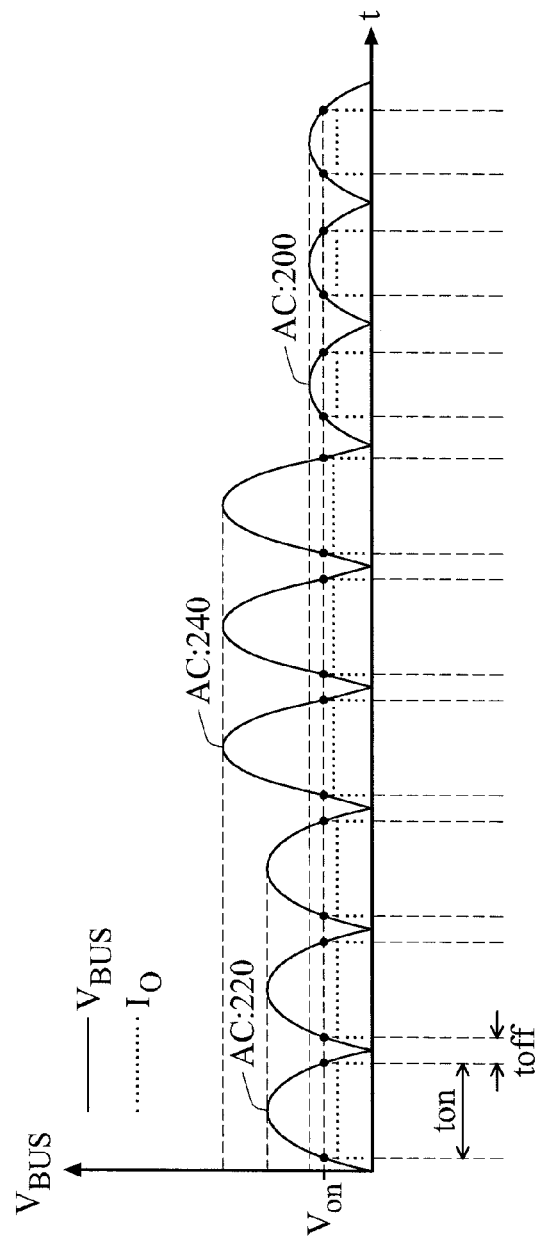
FIG. 2 shows the timing chart of the circuitry system in FIG. 1.
Figure 5:
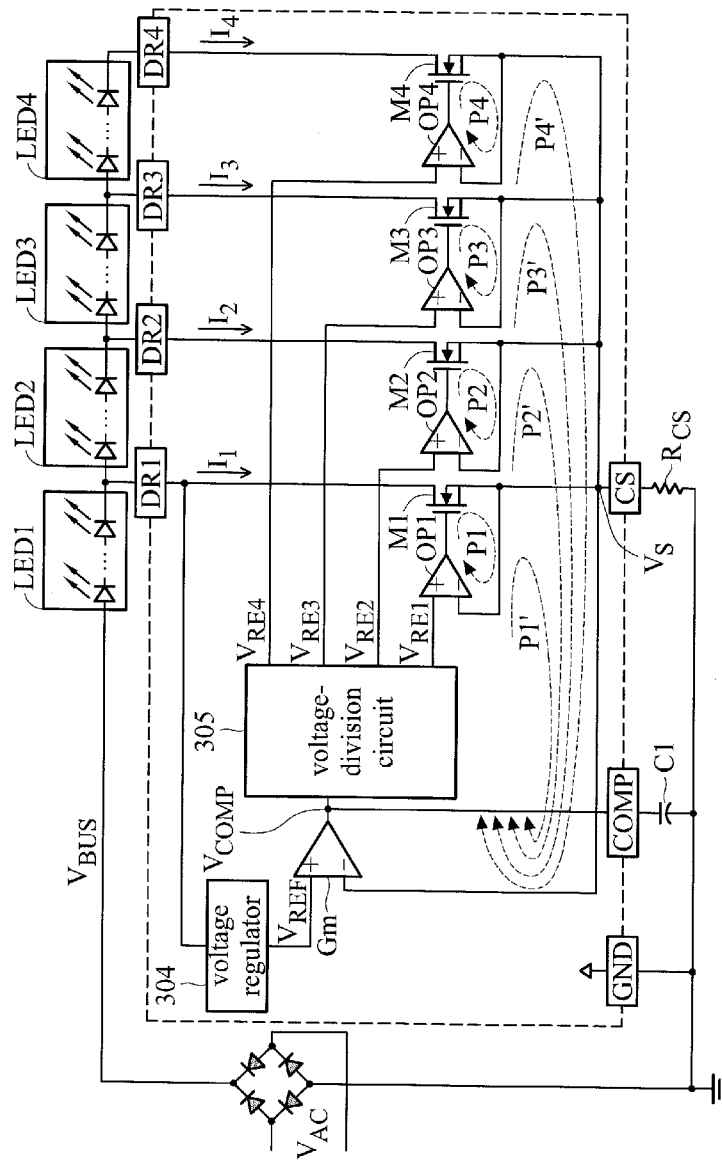
FIG. 5 shows another exemplary embodiment of a current control circuit.

FIG. 5 shows another exemplary embodiment of a current control circuit. The difference between FIG. 2 and FIG. 5 is that both the number of LED components and the number of corresponding current modules are equal to one in the embodiment of FIG. 2, while both the number of LED components and the number of corresponding current modules are more than two in the embodiment of FIG. 5, such as four or any number determined according to the requirements.

In the embodiment of FIG. 5, the current control circuit further comprises a voltage-division circuit 305 which divides the voltage $V_{COMP}$ at the output terminal of the operational amplifier Gm to provide reference voltages $V_{REF1}$, $V_{REF2}$, $V_{REF3}$, and $V_{REF4}$ for the plurality of current modules, wherein, usually, $V_{REF1} < V_{REF2} < V_{REF3} < V_{REF4}$. The structure of the voltage-division circuit 305 is composed of resistors coupled in series for the voltage division, without limitation to the present invention. The input terminal of the voltage regulator 304 is coupled to the input terminal DR1 of the first current module among the plurality of current modules to provide a stable reference voltage $V_{REF}$ for the operational amplifier Gm. The respective output terminals of the current modules are coupled to the common output terminal CS. The inverting input terminal of the operational amplifier Gm is coupled to the common output terminal CS.

In other words, the embodiment of FIG. 3 provides a current control circuit which accomplishes the closed-loop constant-current control for one single LED component, while the embodiment of FIG. 5 accomplishes a current control circuit which performs the closed-loop constant-current control for a plurality of LED components (LED1-LED4). The operation principle of the current control circuit in FIG. 5 is similar to that in FIG. 3, thus, the related description is omitted here.

As described above, the current control circuit in each of the embodiments is capable of adjusting the LED turn-on current in different turn-on angles to compensate for the variation of the LED average current which is induced by the variation of the turn-on angle due to the fluctuation occurring on the AC voltage from the electric grid, so that the LED average output current keeps constant, which avoids the LED flicker occurring when the AC voltage fluctuates.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A current control circuit for a driving circuitry system of a light-emitting diode (LED) component, the driving circuitry system comprising a current module and a rectifier, the rectifier performing full-wave rectification on an AC input and providing a rectified voltage to an anode of the LED component, an input terminal of the current module being coupled to a cathode of the LED component to set a current flowing through the LED component, and the current control circuit comprising:

a voltage regulator having an input terminal coupled to the input terminal of the current module and an output terminal coupled to a non-inverting input terminal of a first operational amplifier;

the first operational amplifier having an inverting input terminal coupled to an output terminal of the current module and an output terminal coupled to one terminal of a capacitor, wherein an output-terminal voltage of the first operational amplifier is provided as a reference voltage for the current module;

the capacitor, wherein the one terminal of the capacitor is coupled to the output terminal of the first operational amplifier, and another terminal of the capacitor is coupled to a ground; and a resistor having one terminal coupled to the inverting input terminal of the first operational amplifier and another terminal coupled to the ground, wherein the current module comprises:

a second operational amplifier having a non-inverting input terminal receiving the reference voltage provided by the current control circuit, an inverting input terminal coupled to the output terminal of the current module, and an output terminal coupled a gate of a transistor; and the transistor having a drain coupled to the input terminal of the current module, and a source coupled to the output terminal of the current module.

2. The current control circuit as claimed in claim 1, wherein the driving circuitry system comprises a plurality of LED components and a plurality of current modules which set turn-on currents for the plurality of LED components, and output terminals of the plurality of current modules are coupled to a common output terminal, and wherein the input terminal of the voltage regulator is coupled to an input terminal of a first current modules among the plurality of current modules, and the inverting input terminal of the first operational amplifier is coupled to the common output terminal.

3. The current control circuit as claimed in claim 1 further comprising:

a voltage-division circuit dividing the output-terminal voltage of the first operational amplifier to provide reference voltages for the plurality of current modules.

4. The current control circuit as claimed in claim 1, wherein the output-terminal voltage of the first operational amplifier decreases when the LED component is turned on and increases when the LED component is turned off.

5. The current control circuit as claimed in claim 1, wherein an average current flowing through the LED component is defined as:

$$I_{AVG} = V_{REF} \times R_{CS}$$

wherein $V_{REF}$ represents a voltage at the non-inverting input terminal of the first operational amplifier, and $R_{CS}$ represents a resistance value of the resistor.

* * * * *